United States Patent
Stone et al.

(10) Patent No.: US 9,461,770 B2
(45) Date of Patent: Oct. 4, 2016

(54) METHOD AND SYSTEM FOR FLOATING GRID TRANSCEIVER

(71) Applicant: Skorpios Technologies, Inc., Albuquerque, NM (US)

(72) Inventors: Robert J. Stone, Berkeley, CA (US); John Zyskind, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 14/485,401

(22) Filed: Sep. 12, 2014

(65) Prior Publication Data

US 2015/0071639 A1    Mar. 12, 2015

Related U.S. Application Data

(60) Provisional application No. 61/877,208, filed on Sep. 12, 2013.

(51) Int. Cl.
*H04J 14/02* (2006.01)
*H04B 10/04* (2006.01)
*H04B 10/50* (2013.01)

(52) U.S. Cl.
CPC ......... *H04J 14/0227* (2013.01); *H04B 10/506* (2013.01)

(58) Field of Classification Search
CPC  H04J 14/0227; H04B 10/506; H04B 10/572
USPC ........................................... 398/79, 140, 156
See application file for complete search history.

(56) References Cited

U.S. PATENT DOCUMENTS

| | | | |
|---|---|---|---|
| 5,319,667 | A | 6/1994 | Dutting et al. |
| 5,333,219 | A | 7/1994 | Kuznetsov |
| 5,987,050 | A | 11/1999 | Doerr et al. |
| 6,192,058 | B1 | 2/2001 | Abeles |
| 6,714,566 | B1 | 3/2004 | Coldren et al. |
| 6,728,279 | B1 | 4/2004 | Sarlet et al. |
| 7,058,096 | B2 | 6/2006 | Sarlet et al. |
| 8,368,995 | B2 | 2/2013 | Dallesasse et al. |
| 8,559,470 | B2 | 10/2013 | Dallesasse et al. |
| 8,867,578 | B2 | 10/2014 | Dallesasse et al. |
| 2002/0197013 | A1 | 12/2002 | Liu et al. |
| 2003/0128724 | A1 | 7/2003 | Morthier |
| 2004/0037342 | A1 | 2/2004 | Blauvelt et al. |

(Continued)

FOREIGN PATENT DOCUMENTS

WO        2011/046898 A1    4/2011

OTHER PUBLICATIONS

Wesström et al., "Design of a Widely Tunable Modulated Grating Y-branch Laser Using the Additive Vernier Effect for Improved Super-Mode Selection," IEEE 18th International Semiconductor Laser Conference, 2002, 99-100; retrieved from the Internet: <http://photonics.intec.ugent.be/download/pub_1603.pdf>.

(Continued)

*Primary Examiner* — Oommen Jacob
(74) *Attorney, Agent, or Firm* — Kilpatrick Townsend & Stockton LLP

(57) ABSTRACT

A multi-channel transceiver using a floating frequency grid for multi-channel, optical communication is presented. Transmitter frequencies are permitted to drift, and a receiver is tuned to compensate for drifts in the transmitter frequencies.

19 Claims, 6 Drawing Sheets

(56) References Cited

U.S. PATENT DOCUMENTS

| | | |
|---|---|---|
| 2004/0228384 A1 | 11/2004 | Oh et al. |
| 2005/0213618 A1 | 9/2005 | Sochava et al. |
| 2005/0226284 A1 | 10/2005 | Tanaka et al. |
| 2005/0249509 A1* | 11/2005 | Nagarajan ............... B82Y 20/00 398/198 |
| 2006/0088319 A1* | 4/2006 | Morton ................ H04B 10/506 398/79 |
| 2007/0280326 A1 | 12/2007 | Piede et al. |
| 2009/0263142 A1* | 10/2009 | Shen ..................... G02F 1/2225 398/158 |
| 2011/0085572 A1 | 4/2011 | Dallesasse et al. |
| 2011/0085577 A1 | 4/2011 | Krasulick et al. |
| 2011/0135301 A1* | 6/2011 | Myslinski ............ H04B 10/572 398/34 |
| 2011/0267676 A1 | 11/2011 | Dallesasse et al. |
| 2011/0292953 A1* | 12/2011 | Liu ..................... H01S 5/06256 372/20 |
| 2011/0293279 A1* | 12/2011 | Lam ................... H04J 14/0279 398/79 |
| 2012/0057079 A1 | 3/2012 | Dallesasse et al. |
| 2012/0057609 A1 | 3/2012 | Dallesasse et al. |
| 2013/0045006 A1* | 2/2013 | Dahan ................. H04J 14/0257 398/34 |
| 2013/0235890 A1 | 9/2013 | Creazzo et al. |
| 2013/0308951 A1* | 11/2013 | Blumenthal ............ H04J 14/02 398/83 |
| 2015/0071639 A1* | 3/2015 | Stone .................. H04J 14/0227 398/79 |
| 2015/0295821 A1* | 10/2015 | Huang ............... H04Q 11/0066 398/49 |

OTHER PUBLICATIONS

Wesström et al., "State-of-the-Art Performance of Widely Tunable Modulated Grating Y-Branch Lasers," Optical Fiber Communication Conference, Technical Digest (CD) (Optical Society of America, 2004), paper TuE2.
US Non-Final Office Action mailed on Mar. 13, 2012 for U.S. Appl. No. 13/040,179, filed Mar. 3, 2011, all pages.
US Final Office Action mailed on Aug. 13, 2012 for U.S. Appl. No. 13/040,179, filed Mar. 3, 2011, all pages.
US Non-Final Office Action mailed on Dec. 12, 2012 for U.S. Appl. No. 13/040,179, filed Mar. 3, 2011, all pages.

* cited by examiner

METHOD AND SYSTEM FOR FLOATING GRID TRANSCEIVER

CROSS-REFERENCES TO RELATED APPLICATIONS

This application claims priority to U.S. Provisional Patent Application No. 61/877,208, filed on Sep. 12, 2013, the disclosure of which is incorporated by reference in its entirety for all purposes.

BACKGROUND OF THE INVENTION

Since the 1970s, fiber optics have been used to transmit data. Fiber optics are well suited to transmit large amounts of data because many different data streams can be transmitted along a single fiber-optic waveguide by multiplexing the data streams. One example of multiplexing is wavelength-division multiplexing. In wavelength-division multiplexing, many different data streams, each using a separate wavelength, are transmitted through a single waveguide.

BRIEF SUMMARY OF THE INVENTION

Embodiments of the present invention relate to photonic devices. More particularly, embodiments of the present invention relate to devices and methods for operating an optical, multi-channel transceiver using a floating frequency grid. Conventional transceiver systems fix a frequency of an optical receiver and control a frequency of an optical transmitter to match the frequency of the optical receiver. In contrast with conventional transceivers, embodiments of the present invention adjust frequencies at which optical receivers operate to match frequencies of optical transmitters, which can shift during operation.

In some embodiments, an optical communication system comprising a transmitter and a tunable receiver is disclosed. The transmitter is operable to provide optical signals in a plurality of frequency channels characterized by a channel plan. And the tunable receiver is operable to detect the optical signals, wherein the tunable receiver adjusts to match the channel plan. In some embodiments, the transmitter is implemented in a first transceiver and the tunable receiver is implemented in a second transceiver. In some embodiments, portions of the first transceiver and portions of the second transceiver are implemented in silicon photonics. In some embodiments, the channel plan is characterized by a channel spacing that is less than 500 GHz and/or 100 GHz.

In some embodiments, an optical-communication system comprising an input port, a plurality of output ports, and a de-multiplexer is disclosed. The input port is configured to receive an input beam comprising a plurality of carrier signals; the plurality of carrier signals operate at spaced frequencies to form a transmit grid; and the transmit grid is characterized by peak frequencies of the carrier signals. The de-multiplexer is configured to be tuned to the transmit grid such that the plurality of carrier signals of the input beam are divided into the plurality of output ports. In some embodiments, there is variation in spacing between peak frequencies of the plurality of carrier signals. In some embodiments, peak frequencies of the plurality of carrier signals of the transmit grid shift in time such that if the de-mulitplexer had fixed filters, then a power penalty, or an optical signal-to-noise ratio penalty, would exceed a predetermined threshold. In some embodiments, the de-multiplexer is tuned by changing a temperature of the de-multiplexer. In some embodiments, the transmit grid comprises more than four carrier signals. In some embodiments, the transmit grid consists of sixteen carrier signals. In some embodiments, a feedback loop is used to tune the de-multiplexer to the transmit grid.

In some embodiments, a method for receiving a plurality of optical signals using a floating receiver is provided. An input beam is received at an input port, wherein: the input beam comprises a plurality of carrier signals; the plurality of carrier signals operate at spaced frequencies to form a transmit grid; and the transmit grid is characterized by peak frequencies of the carrier signals. It is determined that a de-multiplexer is misaligned with the transmit grid. The de-multiplexer is then tuned to the transmit grid. In some embodiments, power is measured at one or more output ports to determine that the de-multiplexer is misaligned with the transmit grid. In some embodiments, the method further comprises detecting a dither on a first carrier signal of the plurality of carrier signals; and determining that the de-multiplexer is misaligned with the transmit grid is based on detecting the dither. In some embodiments, peak frequencies of the plurality of carrier signals shift in time such that if the de-mulitplexer was not configured to be tuned, then a bit error rate of at least one of the plurality of carrier signals would exceed a predetermined threshold.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
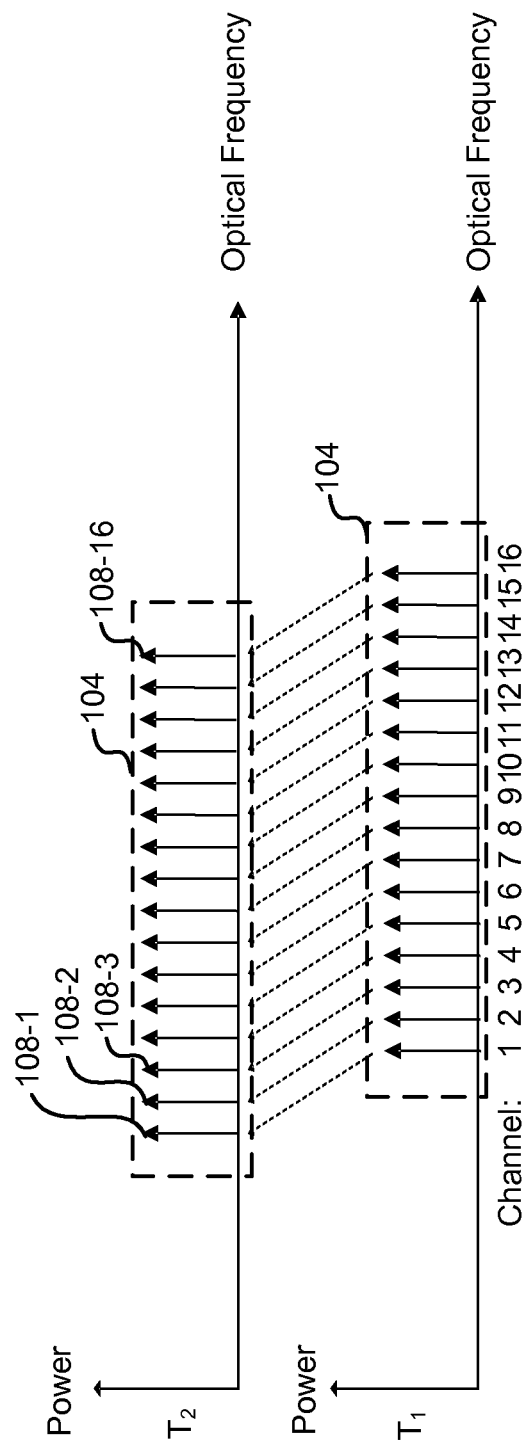
FIG. 1 is a simplified plot of an embodiment of a transmit grid at two different temperatures.

FIG. 1 is a simplified plot of an embodiment of a transmit grid 104 at two different temperatures. The transmit grid 104 comprises a plurality of carrier signals 108 (represented by solid arrows). In this embodiment, the number of carrier signals 108 is sixteen. A first carrier signal 108-1 corresponds to a first channel, a second carrier signal 108-2 corresponds to a second channel, a third carrier signal 108-3 corresponds to a third channel, and so forth such that a sixteenth carrier signal 108-16 corresponds to a sixteenth channel. But in other embodiments, more or less than sixteen channels are used (e.g., at least 2, 4, 8, 16, 32, and/or 64 channels are used). A predetermined number of channels (e.g., 16 channels) are loosely aligned to a first nominal optical frequency (e.g., at a spacing of, and/or less than, 50, 100, 200, 400, 500, 1000, and/or 1500 GHz).

As illustrated in FIG. 1, at a first temperature $T_1$, the carrier signals 108 are evenly spaced and form the transmit grid 104 (in some embodiments, the transmit grid 104 is referred to as a frequency comb and/or a channel plan, wherein the channel plan includes a determination of spacings between carrier signals 108). As temperature increases from the first temperature $T_1$ to a second temperature $T_2$, the transmit grid 104 redshifts. Though the transmit grid 104 has carrier signals 108 that are evenly spaced in the embodiment in FIG. 1, in some embodiments a transmit grid 104 comprises carrier signals 108 that are not evenly spaced. For example, the transmit grid 104 may have a variation in spacing between carrier signals 108 to reduce and/or avoid interference caused by four-wave mixing. In some embodiments, a transmit grid 104 may have a variation in spacing between carrier signals 108 of up to 10%, 20%, 30%, and/or 50%. Thus with a variation of 50%, a first spacing between the first carrier signal 108-1 and the second carrier signal 108-2 may be up to half, or 1.5 times, as much as a second spacing between the second carrier signal 108-2 and the third carrier signal 108-3. For example, if the variation in spacing between carrier signals was up to 50%, and the second spacing (between the second carrier signal 108-2 and the third carrier signal 108-3) was 400 GHz, then the first spacing (between the first carrier signal 108-1 and the second carrier signal 108-2) could vary from 200 GHz to 600 GHz. In some embodiments, variation in spacing between carrier signals 108 vary as a fraction of modulation bandwidth. In some embodiments, variation in spacing between carrier signals 108 differ by at least 0.5*R*(sec/bits)*Hz, wherein R is the bit rate in bits/sec of one of the carrier signals 108. For example, if the first carrier signal 108-1, the second carrier signal 108-2, and the third carrier signals 108-3, have bit rates equal to 10 Gb/s (i.e., R=10 Giga bits/sec); and the first spacing (between the first carrier signal 108-1 and the second carrier signal 108-2) is 400 GHz; then the second spacing (between the second carrier signal 108-2 and the third carrier signal 108-3) would need to be greater than 405 GHz or less than 395 GHz. The difference being calculated by 0.5*[10 Giga bits/sec]*(sec/bit)*Hz=5 GHz.

Figure 2:
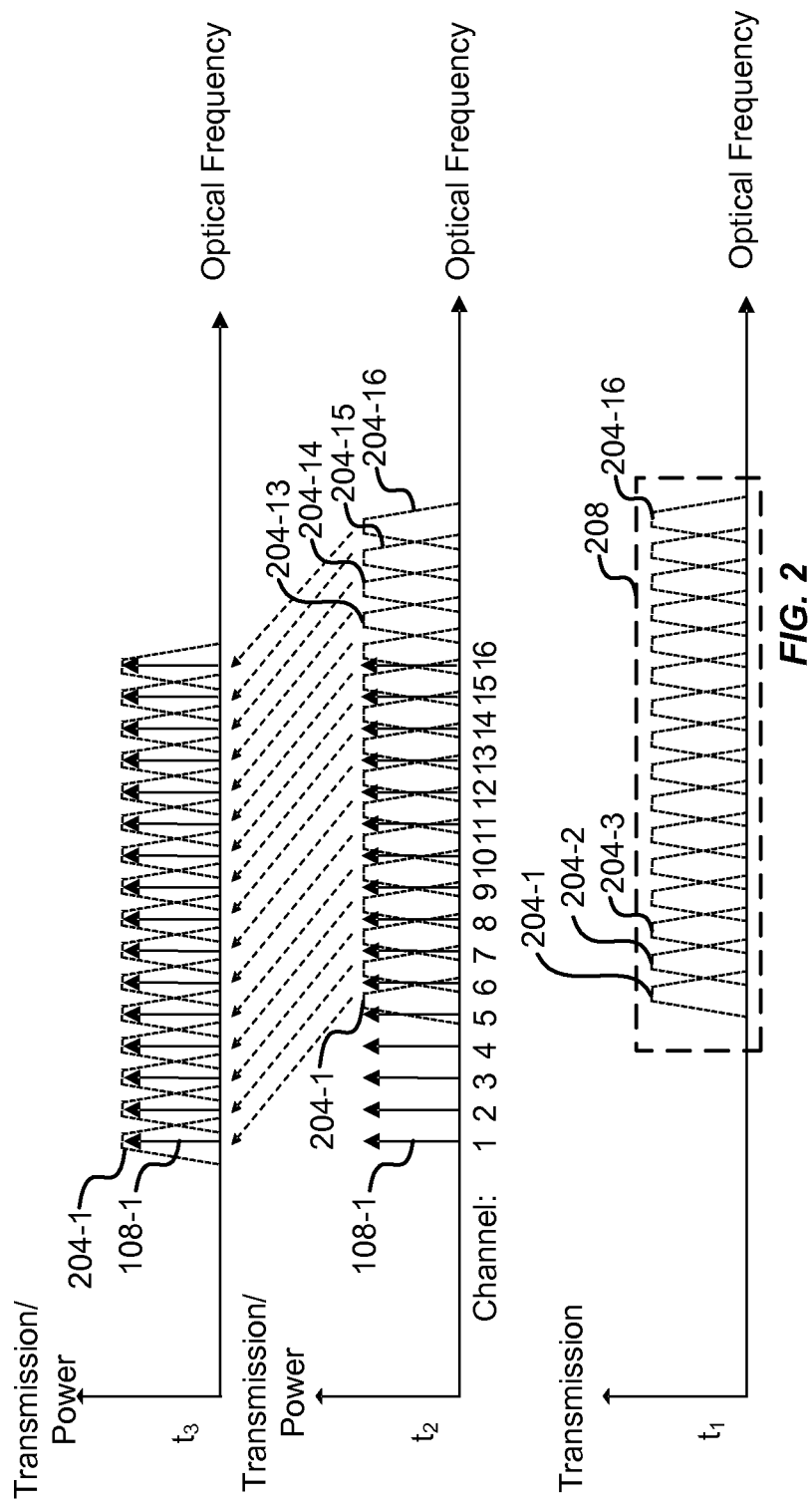
FIG. 2 is a simplified plot of an embodiment of a receiver grid at different operating conditions.

FIG. 2 is a simplified diagram of an embodiment of a receiver grid 208 at different operating conditions. Optical frequency varies along a horizontal axis, and transmission and/or power along a vertical axis. In conventional systems, transmitters are stabilized so that the transmitters remain at fixed frequencies to match receivers set at fixed frequencies. However, in some embodiments of the present invention, carrier signals 108 are allowed to shift (i.e., drift) as illustrated in FIG. 1. In other words, as an ambient temperature changes, optical frequencies of transmit lasers naturally red-shift with increasing temperature, thus causing a temperature dependent offset in a transmit grid 104. To compensate for this temperature dependent offset, a tunable receiver, instead of a fixed receiver is used. The tunable receiver comprises a plurality of filters 204 (e.g., de-multiplexing ports) that are loosely aligned to a second nominal frequency. The plurality of filters 204 loosely aligned to the second nominal frequency is sometimes referred to in this application as the receiver grid 208. FIG. 2 depicts the receiver grid 208 at a first time, $t_1$, before signals are transmitted to a receiver system. The receiver grid 208 comprises sixteen filters 208 (labeled as a first filter 204-1, a second filter 204-2, a third filter 204-3, and so forth to a sixteenth filter 204-16). The filters 204 are represented by trapezoids having dashed lines. In FIG. 2, the filters 204 are evenly spaced from each other. But in some embodiments, the filters 204 are not evenly spaced (e.g., to match variation in spacing between carrier signals 108 of the transmit grid 104). The filters 204 each have a pass bandwidth (e.g., measured at full-width, half-max). In some embodiments, the pass bandwidth of each of the filters 204 are equal. In some embodiments, there is variation between the pass bandwidth of the filters 204.

The filters 204 in the receiver grid 208 have loosely the same spacing as carrier signals 108 of the transmit grid 104. The filters 204 are configured so that while the receiver grid 208 is aligned with the transmit grid 204, each filter 204 passes only one carrier signal 108 (e.g., the first filter 204-1 passes only the first carrier signal 108-1; the second filter 204-2 passes only the second carrier signal 108-2; the third filter 204-3 passes only the third carrier signal 108-3, etc.; as represented by the transit grid 104 aligned with the receiver grid 208 at a third time, $t_3$, in FIG. 2).

At a second time, $t_2$, in FIG. 2, the receiver system receives an input beam comprising the carrier signals 108 (the carrier signals 108 operating at spaced wavelengths to form the transmit grid 104). However, at the second time, $t_2$, the transmit grid 104 is not aligned with the receiver grid 208 (e.g., the first carrier signal 108-1 is not aligned with the first filter 204-1, the second carrier signal 108-2 is not aligned with the second filter 204-2, the third carrier signal 108-3 is not aligned with the third filter 204-3, etc.). In other words, the receiver grid 208 is not aligned with the channels of the transmit grid 104 (e.g., the transmit grid 104 shifted due to change in temperatures of transmitter(s)).

The receiver system is configured to determine that the receiver grid 208 is not aligned with the transmit grid 104. In some embodiments, the receiver grid 208 is aligned (e.g., at the first time $t_1$) to a default frequency grid and the transmit grid 104 is aligned to the default frequency grid. But as discussed above, the transmit grid 104 can shift due to changes in temperature, resulting in a misalignment between the receiver grid 208 and the transmit grid 104. In other words, an offset between the receiver grid 208 and the transmit grid 104 is unknown to the receiver system during initialization at the second time, $t_2$.

In some embodiments, the receiver system scans (e.g., automatically scans) received power levels after the filters 204 to determine that the receiver grid 208 is not aligned with the transmit grid 104. Based on power levels at one or more filters 204 being below a predetermined threshold, the receiver system can determine that the receiver grid 208 is misaligned in relation to the transmit grid 104. In the example at the second time $t_2$ in FIG. 2, there is no carrier signal 108 aligned within a thirteenth filter 204-13, a fourteenth filter 204-14, a fifteenth filter 204-15, and the sixteenth filter 204-16. Thus power levels after the thirteenth filter 204-13, the fourteenth filter 204-14, the fifteenth filter 204-15, and the sixteenth filter 204-16 would be below the predetermined threshold and the receiver system determines that the receiver grid 208 is not aligned with the transmit grid 104. In some embodiments, the receiver system further estimates an offset, and and/or an offset direction, based on a number of filters 204 having power below the given threshold and/or positions of the filters 204 within the receiver grid 208.

After a determination is made that the receiver grid 208 is not aligned with the transmit grid 104, the receiver grid 208 is tuned by one or more methods. For example, the receiver grid 208 is tuned by changing an effective refractive index of a de-multiplexer (demux) (e.g., by using temperature control and/or carrier injection). In some embodiments, the demux comprises a semiconductor material (e.g., silicon). In some embodiments, the demux is formed in silicon. In some embodiments, after power levels exceed the predetermined threshold at the filters 204 (or a predetermined subset of filters 204), the receiver grid 208 is further tuned by maximizing power output at one or more of the filters 204. In some embodiments, a locking system (e.g., using a feedback loop) is used to tune the receiver grid 208 to the transmit grid 104 and/or to keep the receiver grid 208 aligned with the transmit grid 104.

In FIG. 2, at the third time $t_3$, the receiver grid 208 is aligned with the transmit grid 104. The first filter 204-1 passes only the first carrier signal 108-1; the second filter 204-2 passes only the second carrier signal 108-2; the third filter 204-3 passes only the third carrier signal 108-3, and so forth (sometimes referred to as a locked condition and/or normal operation). Thus the receiver system receives all sixteen channels of communication.

Thus operation can be considered as a two-mode process. First, in an initial condition (e.g., initially powering the system on and receiving an input beam; the second time $t_2$ in FIG. 2), the receiver system has no knowledge of actual frequencies characterizing the transmit grid 104. Although the transmit grid 104 may have a nominal spacing (e.g., 100 GHz), transmitter temperature (and therefore an absolute frequency of the transmit grid 104) is unknown to the receiver system at initialization. This initial mode can be referred to as a discovery mode. In some embodiments, the receiver system scans the filters 204 (e.g., demux outputs) to determine a suitable lock point. As illustrated in FIG. 2, the discovery mode during initialization scans the filters 204 (e.g., the demux outputs) to find an appropriate alignment with the transmit grid 104.

In a second mode, which can be referred to as an operating mode or a tracking mode, adjustments are made in the receiver system to maintain a lock as temperature of the transmitter and/or receiver changes and the transmit grid 104 drifts. During the tracking mode, small corrections are made to the receiver system demux to adjust a frequency-grid offset to ensure improved and/or optimal receiver sensitivity and adjacent channel discrimination.

Figure 3:
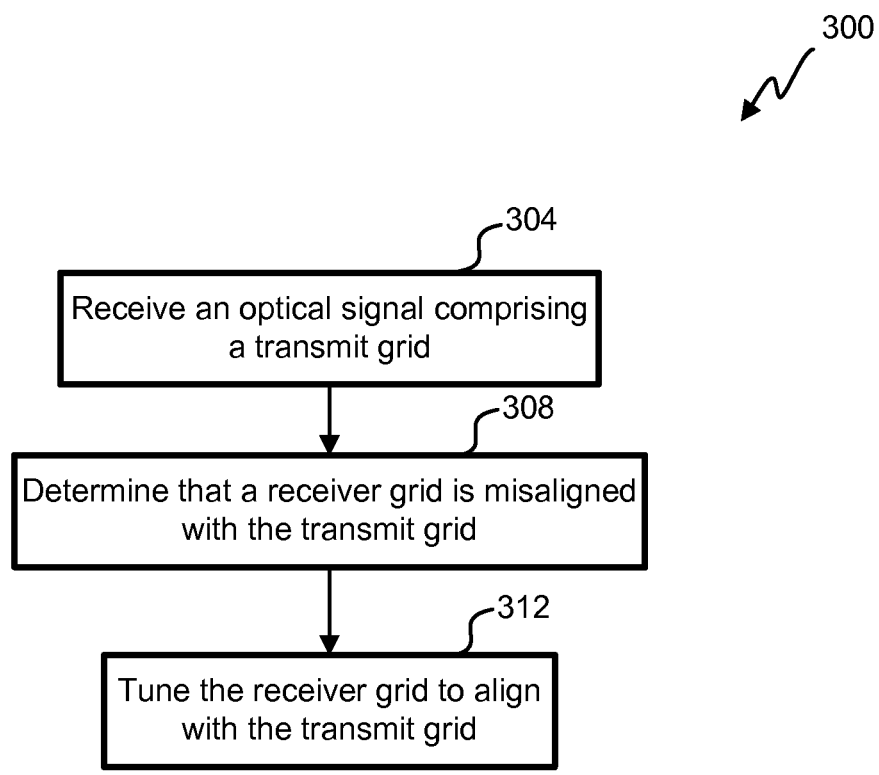
FIG. 3 depicts a flowchart of an embodiment of a process of aligning a receiver grid with a transmit grid.

FIG. 3 depicts a flowchart of an embodiment of a process 300 of aligning the receiver grid 208 with the transmit grid 104. Process 300 begins in step 304 where a receiver system receives an optical signal comprising a transmit grid 104. The transmit grid 104 comprises N number of carrier signals separated from each other by a frequency spacing. In step 308, the receiver system determines that the receiver grid 208 is misaligned with the transmit grid 104. In step 312, the receiver grid 208 is tuned (e.g., by adjusting a de-multiplexer) to align with the transmit grid 104.

In order to tune the receiver grid 208 with the transmit grid 104, a power search algorithm can be utilized in which a nominal power is achieved on each of the different frequency channels. In a misaligned condition, one or more channels (e.g., channels 1, 2, 3, and 4 in FIG. 2 at the second time $t_2$) do not have any optical power measured on a receiver since they are misaligned with no overlap. The power search algorithm can tune the demux of the receiver system to achieve a nominal power on all channels.

Another algorithm could introduce a dither (e.g., frequency and/or AM dither), onto one, some, and/or all of the carrier signals 108 with different amounts of dither for different frequencies, and detect the dither on the carrier signals 108. As an example, if an AM dither is applied to the first carrier signal 108-1 (channel 1) at a transmitter system, the receiver system can be adjusted until the AM dither is observed at channel 1 (i.e., the first filter 204-1) of the receiver system.

Figure 4:
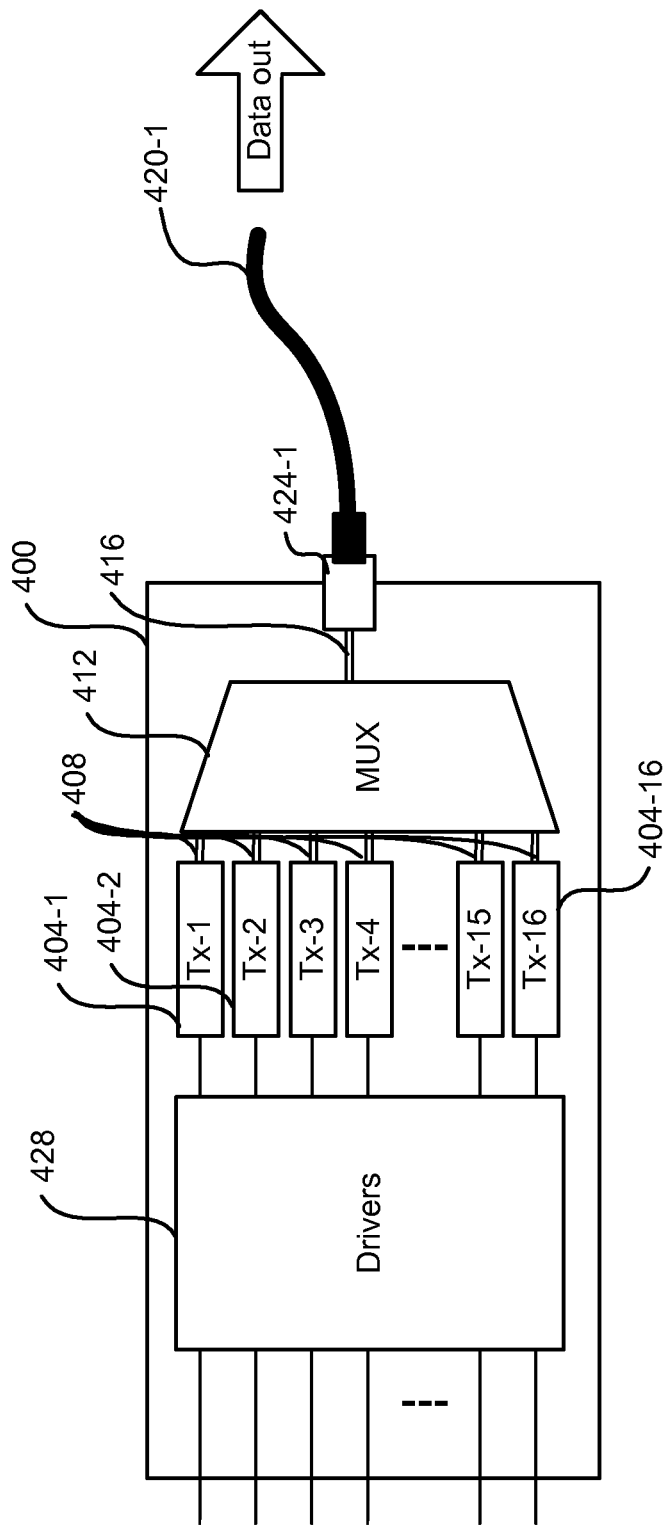
FIG. 4 depicts a block diagram of an embodiment of a transmitter system.

FIG. 4 depicts a block diagram of an embodiment of a transmitter system 400. The transmitter system 400 comprises a plurality of transmitters 404. In this embodiment, the transmitter system 400 comprises sixteen transmitters 404, but more or less could be used. The transmitters 404 operate at different wavelengths. For example, a first transmitter 404-1 generates the first carrier signal 108-1 (in FIG. 1), a second transmitter 404-2 generates the second carrier signal 108-2, and so forth, and a sixteenth transmitter 404-16 generates the sixteenth carrier signal 108-16. The transmitters 404 are optical transmitters (e.g., directly modulated semiconductor lasers and/or LEDs or continuous wave semiconductor lasers and/or LEDs followed by modulator, such as a Mach-Zehnder modulator or an electroabsorption modulator). In some embodiments, the transmitters 404 are integrated onto a common substrate (e.g., silicon and/or SOI substrate). An example of a laser integrated onto a silicon substrate is given in U.S. application Ser. No. 13/605,633, filed on Sep. 6, 2012, which is incorporated by reference. In some embodiments, the transmitters 404 operate at different wavelengths because different gratings are etched to create different reflectance peaks. Thus unlike the gratings in the '633 application, in some embodiments, transmitters 404 in this application have gratings for a resonant cavity that have only one reflectance peak (and reflectance peaks are offset from each other by a known separation).

A plurality of MUX input ports 408 (e.g., waveguides/silicon waveguides) connect the transmitters 404 to a multiplexer 412. The multiplexer 412 (mux) combines the carrier signals 108 from the transmitters 404 into one optical beam to generate the transmit grid 104. The multiplexer 412 has a MUX output port 416 (e.g., a silicon waveguide) that is coupled to an first optical fiber 420-1 by a first coupler 424-1. The coupler first 424-1 matches an optical mode of a silicon waveguide from the MUX output port 416 to a mode of the first optical fiber 420-1. In some embodiments, a LC SMF (Lucent Connector, Single Mode Fiber) connector is used to connect the first optical fiber 420-1 to the first coupler 424-1. But other connectors could be used. Data is then transmitted from the transmitter system 400 through the optical fiber 420. Drivers 428 are used to control current to the transmitters 404 and to provide data modulation.

Figure 5:
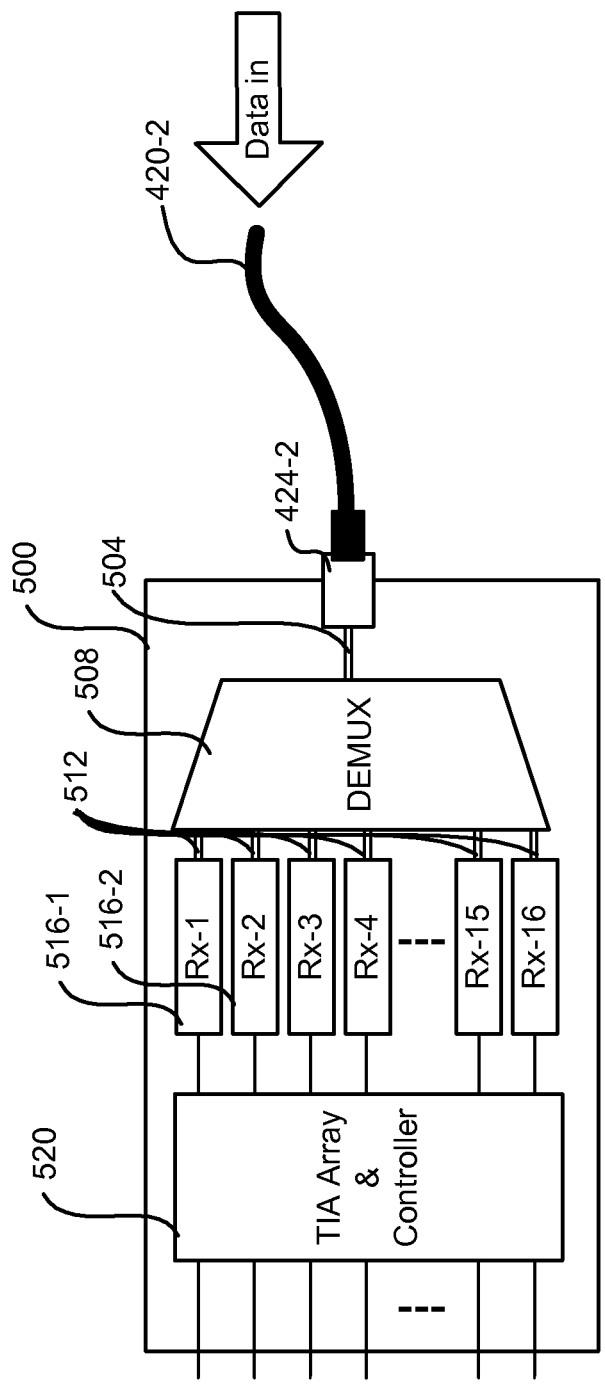
FIG. 5 depicts a block diagram of an embodiment of a receiver system.

FIG. 5 depicts a block diagram of an embodiment of a receiver system 500. The receiver system 500 receives an input beam from a second optical fiber 420-2 (in some embodiments, the first optical fiber 420-1 is the same as the second optical fiber 420-2). The input beam is coupled from the second optical fiber 420-2 by a second coupler 424-2, to an input port 504 of a de-multiplexer (demux) 508. In some embodiments, the demux 508 comprises an arrayed waveguide grating (AWG), and/or an echelle grating. The demux 508 separates the carrier signals 108 into a plurality of output ports 512. The demux 508 is configured to be tuned as discussed in the description of FIG. 2 (i.e., tuning of the demux 508 aligns the receiver grid 208 with the transmit grid 104). The plurality of output ports 512 connect to a plurality of receivers 516. In some embodiments, the receivers 516 are photodiodes. When the receiver system 500 is tuned, the first carrier signal 108-1 is transmitted to a first receiver 516-1, the second carrier signal 108-2 is transmitted to a second receiver 516-2, and so on. The receivers 516 each send an electrical signal to a transimpedance amplifier (TIA) array & controller 520. The TIA array & controller 520 converts currents from the receivers 516 into voltages.

Figure 6:
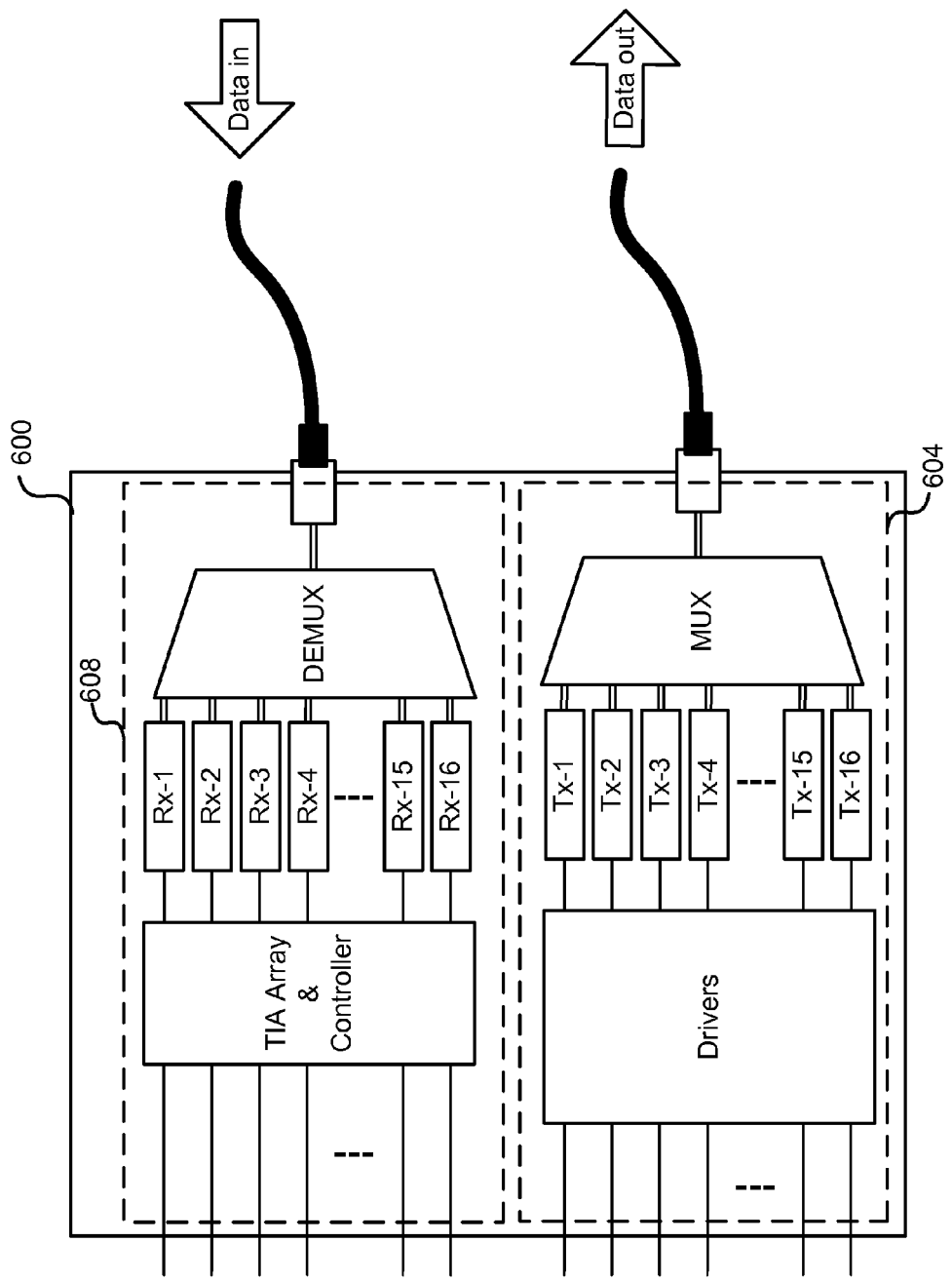
FIG. 6 depicts a block diagram of an embodiment of a transceiver.

FIG. 6 depicts a block diagram of an embodiment of a transceiver 600. The transceiver 600 comprises a transmitter system 604 and a receiver system 608 integrated onto a single chip. In some embodiments, the single chip is a silicon chip. In some embodiments, the transceiver 600 is a 400 Gb/s system. The transmitter system 604 of FIG. 6 is similar to the transmitter system 400 of FIG. 4; the receiver system 608 of FIG. 6 is similar to the receiver system 500 of FIG. 5 (e.g., including the demux 508 that is adjustable). The transmitter system 608 of FIG. 6 comprises sixteen channels operating at 25 Gb/s each, for a total data rate of 400 Gb/s for data out. The receiver system 608 of FIG. 6 receives 400 Gb/s of data in. In FIGS. 4 and 5, the transmitter system 400 was separate from the receiver system 500. In FIG. 6, the transmitter system 604 is combined with the receiver system 608. Thus it should be apparent that the transceiver 600 is used to communicate with other transceivers (i.e., in some embodiments, the transmitter system 604 of the transceiver 600 is configured to send data to a transceiver that is not shown, and the receiver system 608 is tuned to the transceiver that is not show).

Some embodiments of the present invention provide benefits not available with conventional systems, including decreased channel spacing. In conventional systems, compensation for drift in laser frequencies that occurs despite frequency control utilized in transmitters is provided by providing channel spacing that tolerates frequency drift. As an example, channel spacing may be 3500 GHz. As a result, a significant portion of the spectrum is utilized to provide for these tolerances rather than for data transport. Utilizing embodiments of the present invention, locking to the transmit grid 104 enables a reduction in channel spacing, for example to 100 GHz, resulting in a more efficient system. Accordingly, some embodiments of the present invention enable more narrow channel spacing to be used. In some embodiments, active temperature stabilization of transmit laser frequencies is reduced or not utilized while increasing fiber transmission capacity and providing transceivers that have lower cost, complexity, and power dissipation than conventional transceivers. Thus, some embodiments enable a decreased frequency spacing between adjacent channels, even in an uncooled device, in contrast with conventional devices that provide room for frequency tolerance for each channel to compensate for thermal drift.

Since frequencies of the carrier signals 108 drift (e.g., because of change of temperature), the transmit grid 104 can be said to drift in time. In the embodiment in FIG. 1, frequencies of the carrier signals 108 of the transmit grid 104 have drifted more than a spacing between the carrier signals 108. But the transmit grid 104 does not have to drift that much for some embodiments of the present invention to be beneficial. A fixed filter is designed to pass an absolute range of frequencies. If a transmitted signal drifts in relation to the fixed filter, the transmitted signal becomes offset from a center of the fixed filter. If the offset between the transmitted signal and the center of the fixed filter becomes large enough, part (and eventually all) of the transmitted signal will become attenuated by an edge of the fixed filter; and a bit error rate (BER) of the transmitted signal will increase (BER=number of bits in error/total number of bits transmitted). Communication systems are designed to have a BER below a predetermined threshold (e.g., below $10^{-6}$, $10^{-12}$, or $10^{-15}$). Thus for some embodiments to be beneficial, a transmit grid 104 need only to drift sufficiently in comparison to a fixed filter that a BER of at least one of the carrier signals 108 would exceed a predetermined threshold (e.g., a BER threshold). In some embodiments, the transmit grid 104 need only drift sufficiently in comparison to a fixed filter that a power penalty, or an optical signal-to-noise ratio penalty, of one of the carrier signals 108 exceeds a predetermined threshold (e.g., a predetermined threshold of: 0.05, 0.1, 0.2, 0.3, 0.4, and/or 0.5 dB).

It is also understood that the examples and embodiments described herein are for illustrative purposes only and that various modifications or changes in light thereof will be suggested to persons skilled in the art and are to be included within the spirit and purview of this application and scope of the appended claims. For example, the specification above discusses carrier signals 108 and corresponding filters 204 being spaced evenly by frequency. But carrier signals 108, and corresponding filters 204, could be spaced (e.g., evenly) by wavelength.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An optical communications system comprising:
    a transmitter operable to provide a plurality of optical signals in a plurality of frequency channels characterized by a channel plan; and
    a tunable receiver operable to receive the plurality of optical signals, wherein:
        the tunable receiver comprises a plurality of filters operating at a plurality of receiver frequencies;
        each filter of the plurality of filters corresponds to a respective one of the plurality of optical signals; and the tunable receiver is operable to:
  determine that a power level at one or more of the plurality of filters is below a predetermined threshold;
  estimate a frequency offset by determining a number of filters where the power level at one or more of the plurality of filters is below the predetermined threshold; and
  adjust the plurality of receiver frequencies to match the channel plan based at least in part on the estimated frequency offset and determining that the power level at one or more of the plurality of filters is below the predetermined threshold.

2. The optical communications system of claim 1, wherein the transmitter is implemented in a first transceiver and the tunable receiver is implemented in a second transceiver.

3. The optical communications system of claim 1, wherein portions of the first transceiver and portions of the second transceiver are implemented in silicon photonics.

4. The optical communications system of claim 1, wherein the channel plan is characterized by a channel spacing that is less than 500 GHz.

5. The optical communications system of claim 1, wherein the channel plan is characterized by a channel spacing that is less than 100 GHz.

6. An optical-communication system comprising:
an input port, wherein:
  the input port is configured to receive an input beam comprising a plurality of carrier signals;
  the plurality of carrier signals operate at spaced frequencies to form a transmit grid; and
  the transmit grid is characterized by peak frequencies of the carrier signals;
a plurality of output ports; and
a de-multiplexer, wherein:
  the de-multiplexer comprises a plurality of filters operating at a plurality of receiver frequencies;
  each of the plurality of filters corresponds to a respective one of the plurality of carrier signals; and
  the de-multiplexer is configured to:
    determine that a power level at one or more of the plurality of filters is below a predetermined threshold;
    estimate a frequency offset by determining a number of filters where the power level at one or more of the plurality of filters is below the predetermined threshold; and
    tune the plurality of receiver frequencies to the transmit grid based at least in part on:
      the estimated frequency offset and
      determining that the power level at one or more of the plurality of filters is below the predetermined threshold, such that the plurality of carrier signals of the input beam are divided into the plurality of output ports.

7. The optical-communication system of claim 6, wherein there is variation in spacing between peak frequencies of the plurality of carrier signals.

8. The optical-communication system of claim 6, wherein peak frequencies of the plurality of carrier signals of the transmit grid shift in time such that if the de-mulitplexer had fixed filters, then a power penalty, or an optical signal-to-noise ratio penalty, would exceed a predetermined threshold.

9. The optical-communication system of claim 6, wherein the transmit grid shifts in time such that the peak frequencies of the carrier signals shift by an amount greater than a spacing between the peak frequencies.

10. The optical-communication system of claim 6, wherein the de-multiplexer is tuned by changing a temperature of the de-multiplexer.

11. The optical-communication system of claim 6, wherein:
  there are N number of carrier signals in the input beam; and
  there are N number of output ports, such that each of the plurality of output ports is configured to receive no more than one carrier signal when the de-multiplexer is tuned to the transmit grid.

12. The optical-communication system of claim 11, wherein N is equal to or greater than four.

13. The optical-communication system of claim 11, wherein N is equal to sixteen.

14. The optical-communication system of claim 6, wherein a feedback loop is used to tune the de-multiplexer to the transmit grid.

15. The optical-communication system of claim 6, wherein the plurality of output ports are coupled to a plurality of silicon waveguides.

16. A method for receiving a plurality of optical signals comprising:
receiving an input beam at an input port, wherein:
  the input beam comprises a plurality of carrier signals;
  the plurality of carrier signals operate at spaced frequencies to form a transmit grid; and
  the transmit grid is characterized by peak frequencies of the carrier signals;
measuring a power level at each of a plurality of filters, wherein:
  each of the plurality of filters corresponds to a respective one of the plurality of carrier signals;
  the plurality of filters operate at spaced frequencies to form a receiver grid; and
  the receiver grid is initially aligned to a default frequency grid;
determining that a power level at one or more of the plurality of filters is below a predetermined threshold;
estimating a frequency offset by determining a number of filters where the power level at one or more of the plurality of filters is below the predetermined threshold; and
tuning the receiver grid to the transmit grid, based at least in part on:
  determining that the power level at one or more of the plurality of filters is below the predetermined threshold; and
  the estimated frequency offset.

17. The method for receiving the plurality of optical signals of claim 16, wherein tuning the receiver grid further comprises adjusting the receiver grid to maximize the power level at one or more of the plurality of filters.

18. The method for receiving the plurality of optical signals of claim 16, wherein there is variation in spacing between peak frequencies of the plurality of carrier signals.

19. The method for receiving the plurality of optical signals of claim 16, wherein peak frequencies of the plurality of carrier signals shift in time such that if the receiver grid was not configured to be tuned, then a bit error rate of at least one of the plurality of carrier signals would exceed a predetermined threshold.

* * * * *